May 9, 1933. J. R. COX 1,908,408
METHOD OF AND APPARATUS FOR CONTROLLING AIRCRAFT
Filed April 8, 1929 4 Sheets-Sheet 1

Inventor
Jerome R. Cox By
Paul M. Phillip
Attorney May 9, 1933.                    J. R. COX                    1,908,408
                METHOD OF AND APPARATUS FOR CONTROLLING AIRCRAFT
                        Filed April 8, 1929          4 Sheets-Sheet 4

Inventor
Jerome R. Cox
By
Paul M. Phillips
Attorney

Patented May 9, 1933

1,908,408

UNITED STATES PATENT OFFICE

JEROME R. COX, OF HARTFORD, CONNECTICUT, ASSIGNOR TO BENDIX AVIATION CORPORATION, OF SOUTH BEND, INDIANA, A CORPORATION OF DELAWARE

METHOD OF AND APPARATUS FOR CONTROLLING AIRCRAFT

Application filed April 8, 1929. Serial No. 353,464.

My invention relates in general to aircraft and more particularly to control means therefor. It relates specifically to devices for use in the landing of aircraft.

It is recognized that at present the human element in the operation of aircraft is a large factor, and is in fact of such vital importance that only persons having excellent eyesight, mental alertness and proper physical and mental coordination have been considered competent as pilots. In fog or at night, even capable and experienced pilots have often been virtually helpless, as they could not accurately judge the distance between the airship and the ground.

An object of my invention is to provide an automatic means to assist in the landing of aircraft.

Further objects of my invention are to provide automatic means as stated above which will be effective in fog or in darkness; to provide means which will indicate to the pilot accurately when the airship has reached a definite distance from the earth; to provide means for automatically deflecting the nose of the airship upward whenever it reaches this distance whether the ship is being intentionally landed or is merely flying near the earth; and to enable pilots to make uniform good landings regardless of low visibility, rough ground, inexperience or temporary disability.

A further object of my invention is to provide a stabilizing means by which the flight of the airship may be selectively stabilized longitudinally, in any one of two or more predetermined angles with the horizontal or "attitudes". My invention also includes in this connection means by which any of the stabilized attitudes of the airship may be independently varied.

Further objects of my invention will be apparent from the following specifications and claims and from a consideration of the attached drawings.

In order to more clearly explain my invention, several mechanical embodiments thereof are described and illustrated in the following specification and the attached drawings in which.

In the use of my improved means for landing an airplane, the pilot having located the general outlines of the landing field by vision, radio or other means, guides the airplane to the proper position relative to the field, noses the airplane down at a normal gliding angle, throttles the engine down to the minimum, and sets the automatic mechanism as hereinafter described. This mechanism includes a depending part or actuating element, adapted to contact with the ground. When the depending or contacting part of the device strikes the ground, it actuates the elevating controls through suitable connections, so that the angle of the airplane is changed from a gliding angle to one in which the nose is above the horizontal, whereby the airplane may automatically land itself. At the same time an indicator is operated, whereby the pilot may, if he desires, move the controls manually to complete the landing.

Referring to Figs. 1 to 7, I have shown an airplane 30 having landing wheels 31, a tail skid 32, an elevator 33 hinged to the tail unit and actuated by control wires 34 and 35 fastened to the brackets 34a and 35a on the elevator 33 in the well known manner. A depending leg 36, having a foot 37 is attached to a disk 38, (Fig. 5), the disk 38 being suitably secured to a sleeve 39 mounted for rotative movement on a shaft 40. The foot 37 may be replaced if desired, by a wheel such as one of the landing wheels 31. The leg and foot constitute a contact element or actuating member, and may be made of any suitable material, as for example, rubber or light spring steel. The shaft 40 is pivotally mounted in suitable supports such as the brackets 41 fastened to the floor 48 of the fuselage of the airplane.

The contact element is adapted to be manually moved by suitable mechanism of which the following may serve as an example. The sleeve 39 is pivotally mounted on the shaft 40, but is not slidable thereon. A lever 42 is provided on the sleeve 39 and is connected at 43 to a link 44, which is fastened at its other end to a lever 46 at 45. The lever 46 is pivoted upon a bracket 47 fastened to the floor 48 of the fuselage of the airplane in a position at one side of the pilot. By operating the lever 46, the pilot may move the sleeve 39 and thereby move the leg 36.

The airplane may be normally controlled during flight by the "stick" in the usual manner. In the form illustrated the shaft 40 has secured thereto as by a screw 49, a hub 50 to which is fixed lever arms 51 and 52. The arms 51 and 52 have pivoted thereto at 53 and 54, the elevator control wires 34 and 35, respectively. Also pivoted at 54a to the arm 52 is a link 56 which is pivotally connected at it other end 57 (Fig. 4) to a control lever or "stick" 58 pivoted upon a fixed bracket 59. The control lever or "stick" 58 may be designed to control both the elevators and the ailerons of the airplane as is usual in airplane construction. The "stick" normally controls the elevators, by means of the connections above described through the link 56, the arms 51 and 52, the wires 34 and 35 and the brackets 34a and 35a. Pushing the "stick" 58 forward depresses the elevators which deflects the airplane downward and conversely, pulling the "stick" backward raises the elevators and deflects the airplane upward.

Figure 4:
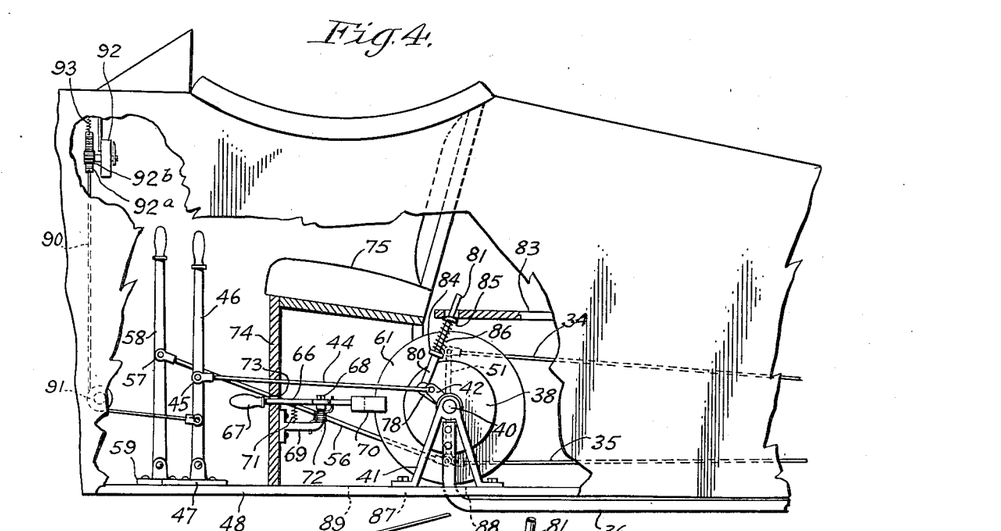
Fig. 4 is an elevation of a part of the airplane shown in Fig. 1 on a larger scale, with parts broken away and parts in section to show the operating mechanism.

The shaft 40 is provided with a key 60 (Fig. 5) which cooperates with a keyway 62 formed in a disk 61 whereby the disk 61 may slide on the shaft freely but must turn with the shaft. The disk 61 has a recess 63 for the reception of the disk 38. The disk 38 is provided with a pin 64 adapted to be received in a cooperating aperture 65 for providing a driving connection between the disks 38 and 61. The pin 64 and aperture 65 are so arranged that when the elevators are in neutral position and the leg 36 is lowered to the position shown in Fig. 2, the pin 64 will register with the aperture 65. A lever 66 having a handle portion 67 at its outer end is loosely pivoted at 68 to a bracket 69 and is provided at its inner end with a yoke 70 which embraces the disk 61. The pilot may, by a lateral movement of the handle 67, slide the disk 61 on the shaft 40. If the pin 64 and aperture 65 are in registration, the clutch comprising disks 38 and 61 may be engaged to connect the leg 36 to the shaft 40 and through the arms 51 and 52 and the wires 34 and 35 to connect the leg 36 with the elevators 33. A tension spring 71 extends between the lever 66 and the bracket 69 and urges the handle 67 of the lever 66 downward. A torsion spring 72 surrounds the upturned portion of the bracket 69 and bears, as shown in Fig. 4, against the rearward portion of the lever 66, thus tending to turn the said lever in a clockwise direction looking downward and thus tends to engage the clutch. The lever 66 extends forwardly through a slot 73, (Fig. 6) in the front 74 of the pilot's seat 75. This slot is provided adjacent to its ends with downward extending notches 76 and 77 which are adapted to hold the lever 66 against lateral movement and thus to prevent the clutch from being accidentally moved.

A lever 78 is provided on the sleeve 39 and has pivotally fastened thereto at its outer end 79 a rod 80 having a reduced portion 81 in prolongation thereof. The portion 81 extends loosely through an enlarged aperture 82 in a bracket 83 which is fastened to the framework of the fuselage in any suitable manner. A compression spring 86 extends between the shoulder 84 on the rod 80 and a washer 85 which abuts against the under side of the bracket 83.

A longitudinal slot 87 is provided in the floor 48 of the fuselage to permit the passage of the leg 36, the rear 88 and the front 89 of this slot providing stops for the rearward and forward movement of the leg. If desired, suitable resilient stops may also be provided to cushion the movement of the leg 36. The spring 86 acts through the rod 80 and the lever 79 resiliently to retain the leg 36 in either its forward or rearward position.

I provide means for indicating to the pilot when the plane is a predetermined distance from the ground, this means including a suitable indicating device located in front of the pilot's seat. Referring to Fig. 4, a wire 90 connected to the lever 46 is passed around a pulley 91 and is connected at its opposite end to a rack 92a which operates the pinion 92b of an indicator 92, a spring 93 serving to move the rack upward when such movement is permitted by the position of the lever 46. The wire 90 thus moves the indicator from its normal position when the leg 36 is lowered. When the leg 36 is actuated by the contact of the foot 37 with the ground, the lever 46 is moved, thereby moving the indicator from its normal position and advising the pilot that the airplane is within a predetermined distance from the ground. The pilot may, if he so desires, then proceed to land in the usual manner. If desired, the indicator may be graduated to show the exact distance from the ground, assuming a definite angular position of the airplane, inasmuch as the distance is relative to the angle of movement of the leg 36.

Figures 1, 2:
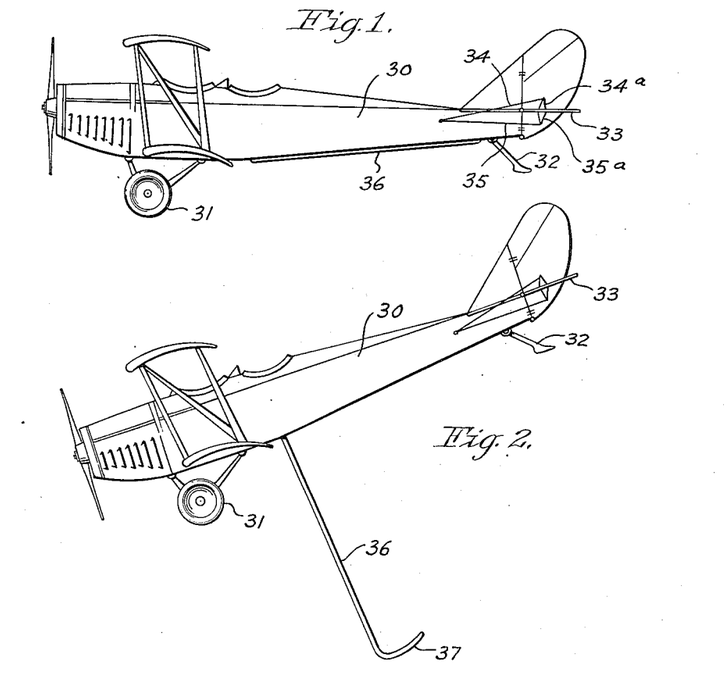
Figure 1 is an elevation of an airplane equipped with one mechanical embodiment of my invention, with the parts in the flying position.
Fig. 2 is an elevation of the airplane shown in Fig. 1 with the parts set for landing.
Figure 3:
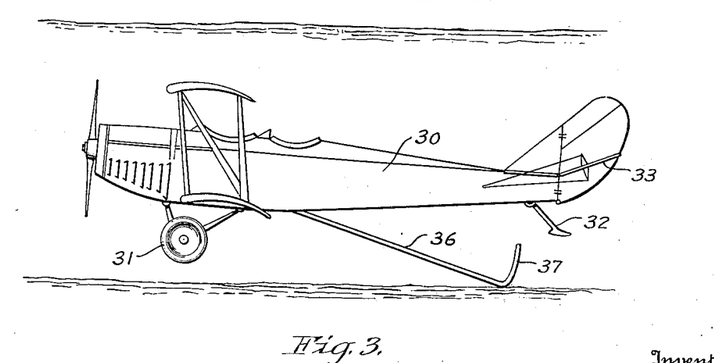
Fig. 3 is an elevation of the airplane shown in Fig. 1 when it has nearly reached its landing position.
Figures 5, 6, 7:
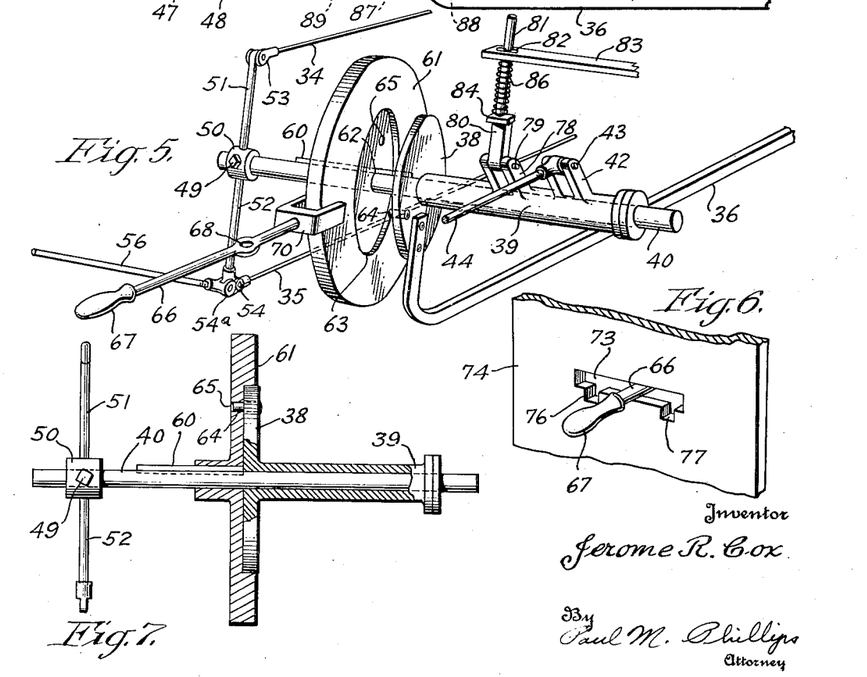
Fig. 5 is a detailed view in perspective of a part of the mechanism shown in Fig. 4.
Fig. 6 is a view in perspective of the clutch operating lever shown in Figs. 4 and 5.
Fig. 7 is an elevation with parts in section showing the clutch of Figs. 4 and 5.

In the operation of the above described mechanism, the pilot flying with the parts in the positions illustrated in Figs. 1, 4 and 5, attains a point at which the airplane will by a normal glide reach the landing field. He then noses the airplane downward at a normal gliding angle, and then pulls back the lever 46. The sleeve 39 is thus rotated swinging the leg 36 to its lower or forward position. The pilot next releases the clutch operating lever 66 by lifting it from the slot 77, the lever 66 being moved toward his right (left in Fig. 6) by the spring 72. When the elevators 33 are placed in the neutral position, the pin 64 will enter the aperture 65 engaging the clutch. The parts are then in the position illustrated in Figs. 2 and 7. The pilot may now devote his attention entirely to his aileron and rudder controls, maintaining the proper balance and direction for the airplane, which continues to glide at its characteristic stable angle until the foot 37 strikes the ground. The leg 36 is moved backward by the contact with the ground until the toggle comprising the lever 78 and the rod 80 passes the dead center position, the leg 36 being then approximately in the position shown in Fig. 3. The spring 86 then swings the leg 36 to the flying position as shown in Figs. 1 and 4. The first movement of the leg 36 has actuated the indicator 92 to inform the pilot that he is a predetermined distance from the ground. As the leg 36 moves backwardly, it gradually moves the elevators 33 to a position approximating that shown in Fig. 3. The parts are so adjusted that the movement of the leg 36 gradually raises the elevators to keep the airplane from crashing into the ground and to cause it to sink gently to the ground in the correct landing position just as its speed is reduced to the minimum. In landing, as above described, the movement of the elevators 33 and the length of the leg 36 are so adjusted that the wheels 31 and the tail skid 32 strike the ground at approximately the same time and substantially as the airplane slows down to its minimum speed. Substantially simultaneously therewith, the spring 86 completes the movement of the leg and thus raises the elevators to the position of maximum elevation which action aids in keeping the tail down on the ground.

Should the pilot desire to land the airplane independently of the automatic elevator actuating means, but because of fog or darkness is unable to see the ground, he first locates the landing field generally by any suitable means, guides the airplane to a proper position to glide down, then noses down and pulls the lever 46 back as before, but does not disturb the lever 66 which remains in the slot 77, the pilot thus continuing in full control of the airplane. The foot 37 contacts with the ground and is moved thereby to actuate the indicator 92 through the connections above described, so that the pilot knows that the ground is a predetermined distance below him, and may pull on the control stick 58 backwardly to raise the nose of the airplane and thus to land it in the usual manner.

Figures 8, 10, 11:
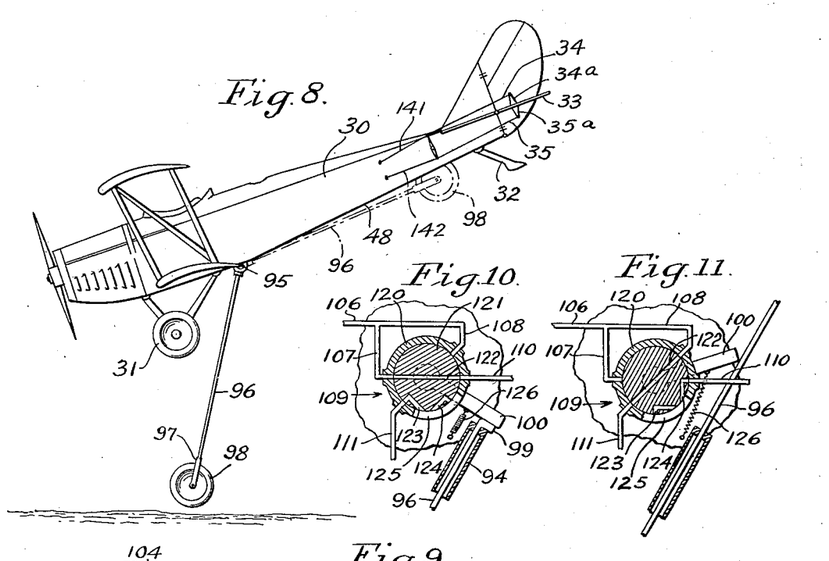
Fig. 8 is an elevation corresponding to Fig. 2 but showing another embodiment of my invention.
Fig. 10 is a sectional detail of one of the valves.
Fig. 11 is a similar view showing the valve of Fig. 10 in a different position.
Figures 9, 12, 13, 14:
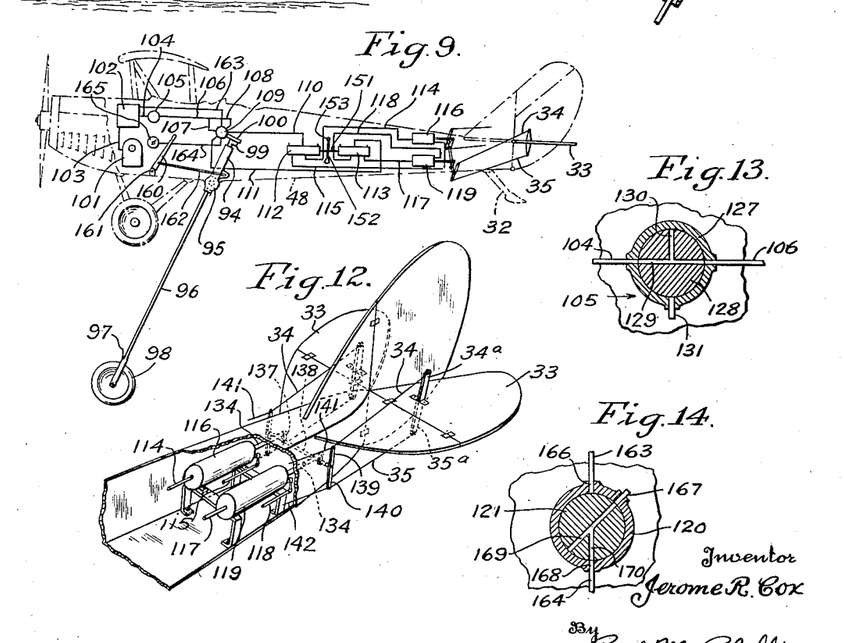
Fig. 9 is a diagram of the pressure lines and connections of a pneumatic system for carrying out my invention, the airplane being shown in conventional outline.
Fig. 12 is a fragmentary perspective of the tail section of an airplane, equipped with the control mechanism illustrated in Figs. 8–11.
Fig. 13 is a section of a manually controlled valve of the embodiment illustrated in Figs. 8–12.
Fig. 14 is a section of the valve shown in Figs. 10 and 11, the section being taken in a different plane.

I have shown in Figs. 8 to 21 a different means for contacting with the ground, and for transmitting the movement of the contacting means to the elevators 33 and to the indicator. Referring to Figs. 8 and 9, wherein corresponding parts are designated by the same reference characters as in the preceding figures, a sleeve 94 is pivoted at 95 on the floor 48 of the fuselage. The shaft 96 having at its lower end a fork 97 in which is pivoted a wheel 98 is slidably mounted in the sleeve 94 and may be suitably secured against rotation therein. The shaft 96 has a projection 99 at its upper end, which abuts against the upper end of the sleeve 94 in the lowermost position of the shaft and also serves to actuate the lever 100, later to be described, the above described mechanism constituting a contact unit or actuating device corresponding to the leg 36 and foot 37 above described.

For transmitting the impulse derived from movement of the contact unit to the elevators, I show a fluid pressure system, although other means for transmitting this impulse may be used and are within the purview of my invention. Referring to Fig. 9, a pump 101 is provided for compressing fluid such as air in a tank 102 with which it communicates by a pipe 103. A pipe 104 leads from the tank 102 to a manually controlled valve 105 conveniently located within reach of the pilot as on the instrument board or on the side of the cockpit. This valve 105 communicates through the pipe 106 and branch pipes 107 and 108 with the four way valve 109 controlled by the lever 100. The valve 109 communicates through the pipes 110 and 111, with slide valves 112 and 113, respectively. Pipes 114 and 115 lead from the slide valve 112 to the forward and rear portions respectively of the pressure cylinder 116, and pipes 117 and 118 lead from the slide valve 113 to the forward and rear portions respectively of the pressure cylinder 119.

The valve 109, (Figs. 10 and 11) comprise a casing 120 provided with ports to which lead the pipes 107, 108, 110 and 111 and a rotary plug 121 having a diametrical passageway 122 and two angular passageways 123 and 124. The passageway 122 may be positioned to connect pipes 107 and 110, (Fig. 10) or pipes 108 and 111 (Fig. 11). The passageways 123 and 124 are adapted to vent pipes 111 (Fig. 10) or 110 (Fig. 11) by establishing a communication between one or the other of these pipes and the slot 125 in the casing 120, which slot opens to the atmosphere. The lever 100 is suitably secured to the inner plug 121 to turn it from the position shown in Fig. 10 to the position shown in Fig. 11 upon upward movement of the shaft 96, the plug 121 being returned to its initial position (Fig. 10) by the spring 126 when this action is permitted. The valve 105 (Fig. 13) has a casing 127 and a plug 128, through which extends a diametrical bore 129 and an intersecting bore 130 perpendicular to the bore 129. The casing 127 of the valve 105 has diametrically opposite ports to which lead the pipes 104 and 106, and an exhaust port 131 spaced 90° from the other ports. In the position of the parts shown in Fig. 13, the pipe 104 is in communication with the pipe 106 admitting pressure to the valve 109, but if the valve 105 be turned 90° in a clockwise direction, the pressure from pipe 104 is cut off and that in pipe 106 is exhausted through passages 130 and 129 and port 131.

The pressure cylinders 116 and 119 are alike and a detailed description of one will suffice for both. The cylinder 119 (Fig. 21) comprises a casing 132 having ports at the front and rear ends communicating with the pipes 117 and 118 respectively and a piston 133 is arranged to slide within the casing and carries a piston rod 134, coil springs 135 and 136 being interposed between the piston 133 and the ends of the casing 132 to urge the piston 133 to its neutral position. The piston rod 134 is articulated to a lever arm 137 mounted on the shaft 138, so that movement of the piston 133 is effective to turn the shaft 138. The shaft 138 is journaled in suitable bearings (not shown) and carries two pairs of lever arms 139 and 140, lever arms 139 being connected to the levers 34a by wires 34 and lever arms 140 being connected to the levers 35a by wires 35. Wires 141 and 142 are connected to the outer ends of levers 139 and 140 respectively and run forwardly to any usual manual control means such as the levers 51 and 52 and associated operating mechanism (Figs. 4 and 5).

Figure 15:
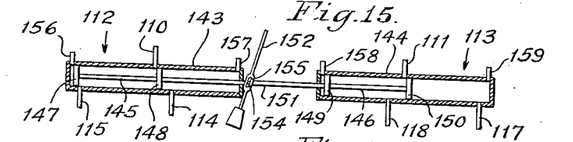
Figs. 15–20 are diagrammatic views showing the two valves of Fig. 9 which control the positions of the elevators, the different views showing various operating positions of the valves.
Figure 20:
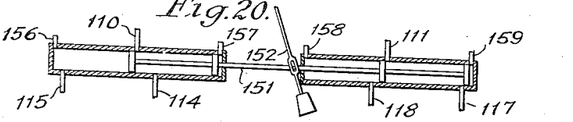
Figure 21:
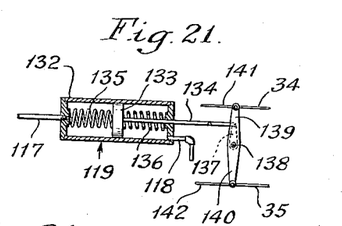
Fig. 21 is a detailed view of one of the pressure cylinders of Fig. 9 with parts in section.

The slide valves 112 and 113, shown diagrammatically in Figs. 15 and 20, comprise casings 143 and 144, respectively. A valve rod comprising portions 145, 146 and 151 is common to the valves 112 and 113 and carries pistons 147, 148, 149 and 150, pistons 147 and 148 being slidable in the casing 143 of the valve 112 and pistons 149 and 150 being similarly disposed in valve 113. For the purpose of controlling the position of the valve rod, I provide a pendulum 152 pivoted at 153 (Fig. 9) and connected to the valve rod by a pin 154 on the rod passing through a slot 155 in the pendulum shaft 152. While I have shown a weight controlled pendulum, I contemplate that gyroscopic control may be used if desired.

Assuming first that the valve 109 is in the position shown in Fig. 10 and the valve rods 145, 146, 151 are positioned as shown in Fig. 15, pressure supplied through pipe 110 will pass through pipe 115 to the rear of pressure cylinder 116 and thus will raise the elevators 33, movement of the valve rod and the pistons carried thereby being permitted by venting the spaces between the pistons 147, 148, 149 and 150 and the respective adjacent heads of valves 112 and 113 through pipes 156, 157, 158 and 159 which are open to the atmosphere. If the valve rods 145, 146, 151 are moved by the pendulum to the position shown in Fig. 16, pressure cannot pass from pipe 110 to either pipe 115 or 114 and those two pipes will be vented through the vent pipes 156 and 157. If the valve rod is moved further to one of the positions shown in Figs. 17 to 20, pressure entering the valve 112 through pipe 110 will pass through pipe 114 to the front of pressure cylinder 116 and thus will depress the elevators 33. Throughout this time, all parts of valve 113 will be open to exhaust. In the positions of the valve rod shown in Figs. 15 and 16 the pipe 114 leading from the front end of cylinder 116 will be open to exhaust through the pipe 157; and in the positions of the valve rod shown in Figs. 16 to 20, the pipe 115 leading from the rear end of cylinder 116 will be open to exhaust through pipe 156.

Assuming now that the valve 109 is in the position shown in Fig. 11, and the valve rods 145, 146, 151 are in any of the positions shown in Figs. 15 to 18, pressure entering the valve 113 through the pipe 111 will pass through the pipe 118 to the rear of pressure cylinder 119 to raise the elevators 53. If the valve rod is moved by the pendulum to the position shown in Fig. 19, both pipes 117 and 118 will be vented through the pipes 159 and 158, respectively. If the valve rod be moved further to the position shown in Fig. 20, pressure entering the valve 113 through the pipe 111 will pass through the pipe 117 to the front of the cylinder 119 to depress the elevators 33. In the positions of the valve rod, shown in Figs. 15 to 19, the pipe 117 leading from the front end of cylinder 119 will be open to exhaust through the pipe 159 and in the positions of the valve rod shown in Figs. 19 and 20, the pipe 118 leading from the rear end of cylinder 119 will be open to exhaust through pipe 158. Throughout this time, all parts of the valve 112 will be open to exhaust.

Figure 16:
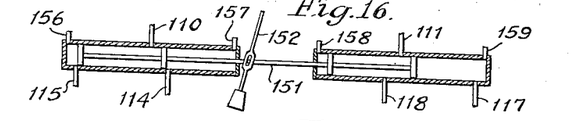
Figure 17:
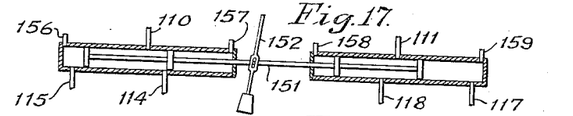
Figure 18:
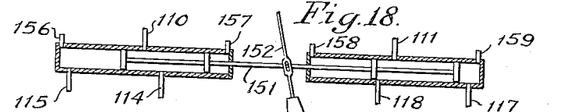
Figure 19:
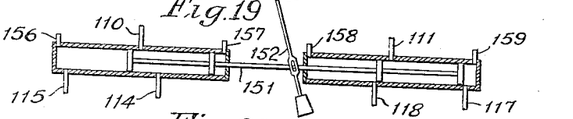

The attitude of the airplane may be controlled by the pressure system, and the parts may be set to stabilize the airplane in two different attitudes. The device, as illustrated, is so arranged that by shifting the position of the valve 109, the angle at which stabilization will be automatically effected is changed from a gliding angle in which the airplane is tilted downward as in Fig. 2 to a landing angle in which the airplane is tilted upward. Furthermore, by shifting the position of either of the valves 112 and 113, in a longitudinal direction, the stable angles may be varied as desired, this shifting being permitted by flexible couplings between the various pressure pipes and the respective valves. The relative position of the pendulum obviously depends on the attitude of the airplane. Thus when the airplane is pointing downward, the pendulum is forward, as it is for example in Figs. 15 to 17; and when the airplane is pointing upward, the pendulum is backward, as it is for example in Figs. 18 to 20. When the pistons of the slide valve 112 are in the position shown in Fig. 16, it may be said to be in neutral and when the valve 109 is in the position shown in Fig. 10, the pendulum may cooperate with the said valve 112 to stabilize the airplane in the position corresponding to the said neutral position. This stabilizing is carried out as follows: Assuming that the valve 109 is in the position shown in Fig. 10 so that the valve 112 controls the elevators and that the airplane is in a position such that the pendulum will be as shown in Fig. 16, both sides of both pressure cylinders 116 and 119 will be vented and the elevators will be maintained in their neutral position by air pressure on their surfaces and by the springs 135 and 136 in the cylinders 116 and 119. If the airplane is moved from the selected attitude by tilting the nose downward, the pendulum will swing forwardly to move the valve to a position substantially as in Fig. 15 and pressure passing through the valve 112 and pipe 115 to the rear of cylinder 116 raises the elevators to bring the airplane back to the selected attitude. If the airplane raises its nose above the selected angle and the pendulum is moved thereby to any position substantially as shown in Figs. 17 to 20, pressure passes through the valve 112, pipe 114 to the forward end of the cylinder 116 which lowers the elevators to bring the airplane back to the neutral attitude. In like manner, when the valve 109 is in the position of Fig. 11, the valve 113 stabilizes the airplane in the position thereof at which the pendulum will hang substantially as shown in Fig. 19 the stabilization being effected in a manner similar to that above described.

Figure 22:
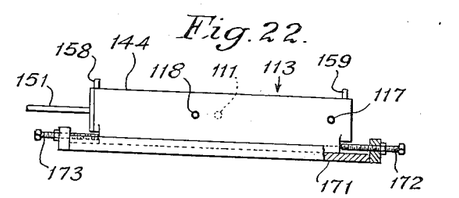
Fig. 22 is an elevation of one of the valve cylinders showing the means for adjusting it longitudinally.
Figure 23:
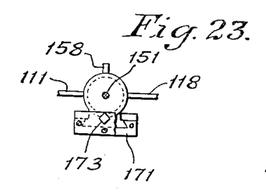
Fig. 23 is an end elevation of the cylinder shown in Fig. 22.
Figure 24:
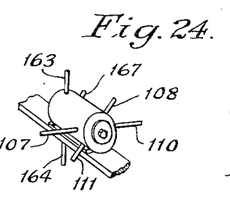
Fig. 24 is a perspective of the valve shown in Figs. 10, 11 and 14.

I prefer to adjust the positions of the valves and the pendulum so that when the pistons are in a position substantially as shown in Fig. 16, the airplane will be in its normal gliding attitude and that when the pistons are in the position shown in Fig. 19 the airplane will be in approximately its landing attitude. The longitudinal adjustment of the valves 112 and 113 will change the neutral position of the pistons and thus stabilization may be had automatically at any desired attitude. For adjusting the valves longitudinally, I have shown in Figs. 22 and 23 a construction in which the valve 113 is mounted for longitudinal sliding movement in a suitable fixed guide member 171 and there are provided adjusting screws 172 and 173 threaded through brackets rigidly secured at each end of the guide members 171 and bearing against a part of the cylinder 113. Thus by suitable adjustment of the screws 172 and 173, the longitudinal position of the cylinder 113 may be changed as desired, thus changing the neutral position of the pistons 149 and 150 and changing the angle or attitude at which the flight of the airplane will be stabilized, the pendulum being swung on a fixed pivot and its connection with the piston rod or valve stem being unchanged. It will be understood that the same or any equivalent adjusting means may be used in connection with the valve 112. By this means, the valve 113 might be adjusted longitudinally, so that the neutral position of the pendulum, corresponding to Fig. 19 might be vertical and the airplane thus be stabilized in a horizontal attitude. In landing, using this adjustment, after the airship had been levelled off by the automatic means, the pilot could resume control of the elevators, independent of the automatic control with the definite knowledge that the airplane is flying in a horizontal attitude at a certain predetermined distance from the ground.

The pilot may, if he desires, turn the valve 105 from the open position shown in Fig. 13 to the closed position which is 90° clockwise therefrom and thus exhaust all excess pressure from the entire automatic system. This exhausted or vented condition is the normal flying condition and is one in which the airplane may be controlled in the usual manner. However, with the valve 105 in the position of Fig. 13, and the valve 109 in the position of Fig. 10, pressure coming from pipe 106, passes through pipe 110 to the valve 112 and possibly through that valve to one or the other of the pipes 114 and 115. As soon as the shaft 96 is raised by the contact with the earth, the pressure is diverted to the valve 113 thus shifting the stabilized angle of the airplane. If desired, means may be also provided for manually operating the valve 109 independently of the movement of the shaft 96.

I provide means for raising and lowering the contact unit in order to allow the decrease of resistance during normal flight. A lever 160 is pivoted at 161 to the floor of the fuselage and is connected by a link 162 to a lug on the sleeve 94 at a point above its pivot 95. The shaft may thus be raised to the dotted line position (Fig. 8) or lowered to the full line position.

Means are provided for indicating the near approach of the airplane to the ground and comprise a pressure pipe 163 (Figs. 9 and 14) leading from the pressure tank 102 to the port 166 of the valve 109 at a point spaced longitudinally thereof from the pipes 107 and 108 and a second pipe 164 leading from the port 168 of the valve 109 to an indicator 165. The valve 109 is provided with bores 169 and 170 (Fig. 14) in the same plane as pipes 163 and 164. An exhaust port 167, open to the atmosphere is in communication with the bore 169, when the bore 170 is in registry with the port 168. The bores 169 and 170 are so arranged that when the valve 109 is in the normal position as shown in Figs. 10 and 14, the pipe 164 and the indicator 165 will be vented to the open air through the opening 167, but when the valve has been moved by the movement of the shaft 96, the pipe 163 will be connected with the pipe 164 through the bore 169 and pressure will be supplied to the indicator. The indicator may be of any suitable construction adapted to be actuated by pressure in excess of atmospheric to give a signal to the pilot.

In landing an airplane provided with this form of my invention, the pilot, having attained a position from which a normal glide will bring the airplane to the landing field, pulls back on lever 160 to bring the sleeve 94 and the shaft 96 from the position shown in dotted lines in Fig. 8 to the position shown in full lines therein. He then depresses the nose of the airplane and closes the throttle which causes the airplane to glide downward and then opens the valve 105 to allow pressure to flow through the pipe 106 to the valve 109. He may thereafter devote his attention entirely to maintaining the lateral balance of the airplane by means of the ailerons and to guiding the airplane by means of the rudder. Assuming that the automatic mechanism is set for a glide, the airplane continues to glide under the control of valve 112, which receives pressure from the valve 109. If the glide becomes too steep, the pendulum 152 swings forwardly and pressure passes from the pipe 110 through the pipe 115 to the rear of cylinder 116 to raise the elevators; and if the glide becomes too shallow, the pendulum 152 swings back and pressure passes through pipe 114 to the front of cylinder 116 to lower the elevators. The airplane thus continues to glide at a substantially constant angle until it has reached the predetermined distance from the earth. The wheel 98 then contacts with the earth and causes the shaft 96 to move up through the sleeve 94 and moves the lever 100 to shift the valve 109 to the position shown in Fig. 11 and divert pressure from the slide valve 112 to the slide valve 113. Pressure then passes through the pipes 111 and 118 to the rear of cylinder 119 and raises the elevators to raise the nose of the airplane until a landing attitude is attained, the airplane attaining this attitude and losing most of its speed just as it sinks gently to the earth. The pilot is informed of the contact of the wheel 98 with the earth by the indicator 165 and may then, if he desires, close the valve 105, and knowing definitely the distance of the airplane from the ground, complete the landing in the usual manner.

Should the pilot desire to make the landing by the aid of my indicator, but without the use of my automatic control, he will move the lever 160 to bring the contact unit to the full line position (Fig. 8) but will not open the valve 105. He will thus continue his glide downward, maintaining proper lateral balance, longitudinal attitude and the desired direction. When the wheel 98 strikes the ground, it urges the shaft 96 upward and moves the valve lever 100 to shift the valve 109 from the position shown in Figs. 10 and 14 to that shown in Fig. 11 in which the pipes 163 and 164 are connected. The pressure chambers 116 and 119 are both vented, so that the shift has no effect upon the position of the elevators, but because of the communication established between the pipes 163 and 164, a signal is given by the indicator 165 and the pilot, knowing that he has reached a predetermined distance from the ground, operates his controls to land the airplane in the usual manner.

Many changes may be made herein, such as changes in the size and location of parts and the interchange or substitution of elements, without departing from my invention. For instance, the contact elements 36 and 96 may be positioned at points farther forward or rearward than the positions shown. The lengths of the shafts 36 and 96 or of the arms 51 and 52 or of the arms 139 and 140 or of all of them may be made adjustable, if desired, or the leg 36 may be combined with the control valve 109 and the fluid pressure system associated therewith.

Thus while I have shown and described but two embodiments of my invention, it is obvious that many modifications may be made therein and many of the individual features may be differently combined or be useful in themselves or in other combinations. I do not wish to be limited, therefore, except by the scope of the appended claims which are to be construed as broadly as the state of the prior art permits.

The term airship as employed in the appended claims is used in its generic sense and includes both heavier than air and lighter than air flying machines.

I claim as my invention:

1. An apparatus for controlling aircraft, comprising a control surface, means for manually moving said surface to control the movements of the airship during normal flight, element connected to the airship and adapted to contact with the earth, manual means for operatively connecting and disconnecting said contact element with said control surface whereby movement of the contact element may move the control surface an amount depending on the amount of movement of the contact element and so that contact of the said element with the earth when it is connected with the control surface will cause a gradual deflection of the nose of the airship upward, to land the airship.

2. Apparatus for controlling aircraft comprising a control surface, means for manually moving said surface to control the movements of the airship during normal flight, an element associated with the airship and adapted to contact with the earth, a connection between said element and said surface so arranged that movement of the contact element causes movement of the control surface, and means for selectively making the connection operative or inoperative.

3. An airship having a movable elevator for controlling the attitude thereof, manual means for moving said elevator, a member depending from the airship and adapted to contact with the ground, said member being pivoted to the airship on a transversely extending horizontal axis, a clutch having one of its components arranged to be moved by said member upon contact with the ground and the other connected to move said elevator, and manual means for engaging the clutch components, whereby the attitude of the airship may be automatically changed by approaching within a predetermined distance from the earth.

4. The combination with an airship and an elevator surface therefor of means for stabilizing the flight of the airship at a desired one of a plurality of different attitudes, comprising a source of pneumatic pressure, a main control valve, a pendulum pivoted on a fixed axis in the airship, a system of stabilized control for each desired stabilized attitude, each system including a fluid pressure piston-cylinder device operatively connected to said elevator surface and a valve for controlling the flow of fluid pressure to said piston-cylinder device, the valve of each of the systems being operated by said pendulum, a connection between said source and said main control valve, and connections between the latter and the valve of each of said systems so arranged that a desired one of said systems may be connected to maintain automatically a predetermined attitude of the airship.

5. The combination with an airship and an elevator surface therefor of means for stabilizing the flight of the airship at either a gliding or a landing angle, comprising a source of pneumatic pressure, a main control valve, a pressure connection between said source and said valve, two independent piston-cylinder devices each operatively connected to said elevator surface, piston valves connected to receive pressure from said main control valve and for controlling the passage of pressure to each of said piston-cylinder devices respectively, a pendulum connected to operate both said piston valves simultaneously, means for manually admitting pressure through said main control valve and one of said piston valves to one of said piston-cylinder devices, whereby stabilization may be effected by said pendulum and said one piston valve at a gliding angle, and means operating in response to the approach of the airplane to a predetermined distance from the ground to shift the main control valve to supply pressure to the other piston valve so that stabilization at a landing angle may be effected by it, and the pendulum.

6. Apparatus for landing an airship, comprising an elevator to control the attitude of the airship, a plurality of fluid pressure cylinders, pistons in each of the cylinders all operatively connected to the elevator, valves for controlling the fluid pressure supplied to each cylinder respectively, a pendulum controlling all the valves so that each valve, when effective, will stabilize the airship in a different predetermined attitude, and means responsive to the approach of the airship to a point a predetermined distance from the earth for shifting the control from one valve to another.

7. Apparatus for landing an aerial vehicle comprising a contact element secured to said aerial vehicle and adapted to be moved relative to the aerial vehicle upon contact with the earth, a control surface operative to control the attitude of said aerial vehicle, means at times responsive to movement of the contact element for moving the control surface, and means for raising the contact element at times without thereby effecting movement of the control surface.

8. An aerial vehicle having a movable control surface for controlling the attitude thereof, manual means for moving said control surface, a member depending from the aerial vehicle and adapted to contact with the ground, a clutch having one of its components rigidly connected with said contact member and the other connected to move the elevator, and manual means for engaging and disengaging the clutch components whereby the attitude of the aerial vehicle may if desired be automatically changed by the approach of the aerial vehicle to a point within a predetermined distance from the earth.

9. Apparatus for landing an aerial vehicle comprising a movable elevator for controlling the attitude thereof, manual means for moving said elevator, a member depending from said aerial vehicle and adapted to contact with the ground, a clutch having one of its components rigidly connected to said depending member and arranged to be moved thereby upon contact with the ground and the other connected to move said elevator, and means for engaging and disengaging the clutch components, whereby the attitude of the aerial vehicle may be, if desired, automatically changed upon the approach of the aerial vehicle to a point within a predetermined distance of the earth.

10. Apparatus for controlling an aerial vehicle comprising a control surface, means for moving said control surface to control the movements of the aerial vehicle during normal flight, an element associated with the aerial vehicle and adapted at times to contact with the earth and be moved relative to the aerial vehicle thereby, a connection between said element and said surface so arranged that relative movement of the contact element at times causes movement of the control surface, and means for selectively making the connection effective or ineffective.

11. Apparatus for landing an aerial vehicle comprising means for automatically stabilizing the flight of the vehicle to cause it to maintain a selected gliding attitude, and means responsive to the approach of the aerial vehicle to a predetermined vertical distance above the earth for automatically releasing the control of said automatic stabilizing means and changing the attitude of said vehicle to a landing attitude.

12. Apparatus for landing an aerial vehicle comprising a contact element secured to said aerial vehicle and adapted to be moved relative thereto upon contact with the earth, a control surface operative to control the attitude of said aerial vehicle, means including said surface for automatically stabilizing the aerial vehicle in a selected gliding attitude, means for adjustably changing the selected gliding attitude at which the aerial vehicle is stabilized, and means responsive to movement of the contact element for automatically changing the attitude of the aerial vehicle from either of said selected stabilized attitudes.

13. Apparatus for landing an aerial vehicle, comprising an elevator to control the attitude of the aerial vehicle, a plurality of fluid pressure cylinders, pistons in each of the cylinders all operatively connected to the elevator, valves for controlling the fluid pressure supplied to each cylinder respectively, means maintained in a substantially constant attitude relative to the earth regardless of the attitude and position of the aerial vehicle for controlling all of the valves so that each valve when effective will stabilize the aerial vehicle in a different predetermined attitude, and means responsive to the approach of the aerial vehicle to a predetermined distance from the earth for shifting the control of the elevator from one valve to another.

14. Apparatus for landing an aerial vehicle, comprising an elevator to control the attitude of the aerial vehicle, a plurality of means all operatively connected to the elevator for at times moving said elevator, means maintained in a substantially constant attitude relative to the earth regardless of the attitude and position of the aerial vehicle for controlling all of the moving means, and means responsive to the approach of the aerial vehicle to a predetermined distance from the earth for making one of said moving means ineffective and another one thereof effective.

15. Apparatus for landing an aerial vehicle comprising means for automatically stabilizing the aerial vehicle in a selected landing attitude, and means responsive to the approach of the aerial vehicle to a predetermined vertical distance above the earth for automatically making effective the control by said automatic stabilizing means and thus for changing the attitude of said vehicle to a landing attitude.

16. Apparatus for landing an aerial vehicle comprising a contact element secured to said vehicle and adapted to be moved relative thereto upon contact with the earth, a control surface operative to control the attitude of said vehicle, and means responsive to the movement of said contact element for moving said control surface, said last named means including a source of power in addition to the movement of said contact element relative to the aerial vehicle.

17. In apparatus for use with an aerial vehicle having a control surface and a fuselage, a contact element pivotally connected to said aerial vehicle, means for connecting said contact element to said control surface, means for moving said contact element from a position depending approximately vertically beneath said aerial vehicle to a position closely adjacent to said fuselage or from last named position to said first named position, and a spring for resiliently holding said contact element in either of said positions.

18. In an aeroplane, an elevator, an arm pivoted on and depending from the aeroplane to be engaged by the ground and moved rearwardly, connection means between the arm and elevator to pull the latter to an elevating position when the arm is thus moved rearwardly and a snap-action spring mounted in connection with the arm tending to hold the arm both in depending and rearwardly moved positions.

19. In an aeroplane, an elevator, an arm pivoted on and depending from the aeroplane to be engaged by the ground and moved rearwardly, connection means between the arm and elevator to move the latter to an elevating position when the arm is thus moved rearwardly, and means resisting return movement of the arm to a depending position after it has once been moved rearwardly a predetermined extent.

20. In an aeroplane, an elevator, an arm pivoted on and depending from the aeroplane to be engaged by the ground and moved rearwardly, connection means between the arm and elevator to move the latter to an elevating position when the arm is thus moved rearwardly, and means acting on the arm to move the same to its rearward limit after it has been once swung rearwardly by engagement with the ground through a certain arc.

21. In an aeroplane, an elevator, an arm pivoted on and depending from the aeroplane to be engaged by the ground and moved rearwardly, connection means between the arm and elevator to move the latter to an elevating position when the arm is thus moved rearwardly, said means including a member for detachable coupling with the arm, and means enabling the arm to be held in a rearward and substantially horizontal position against the fuselage of the aeroplane when said member is uncoupled from the arm.

In testimony whereof I hereunto affix my signature.

JEROME R. COX.